J. MORRIS.

Hand-Seeder.

No. 48,197.

Patented June 13. 1865

UNITED STATES PATENT OFFICE.

JACOB MORRIS, OF AUBURN, MISSOURI.

IMPROVEMENT IN HAND CORN-PLANTERS.

Specification forming part of Letters Patent No. 48,197, dated June 13, 1865.

*To all whom it may concern:*

Be it known that I, JACOB MORRIS, of Auburn, in the county of Lincoln and State of Missouri, have invented a new and Improved Hand Corn-Planter; and I do hereby declare that the following is a full, clear, and exact description thereof, which will enable others skilled in the art to make and use the same, reference being had to the accompanying drawings, forming part of this specification, in which—

Figure 1:
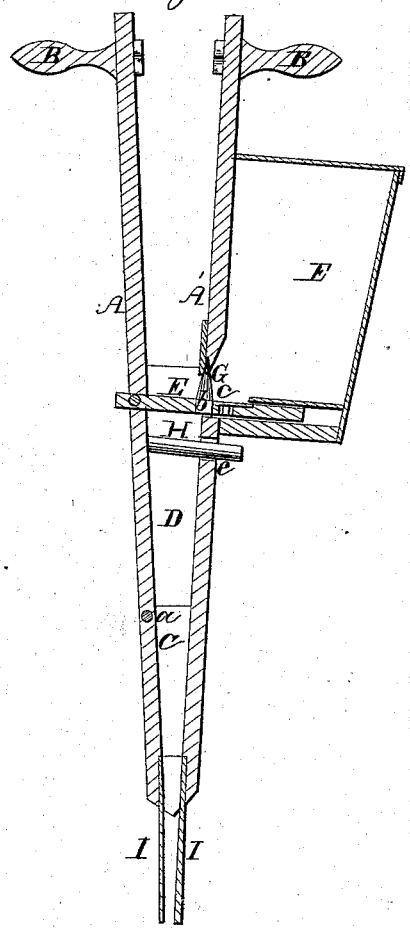
Figure 2:
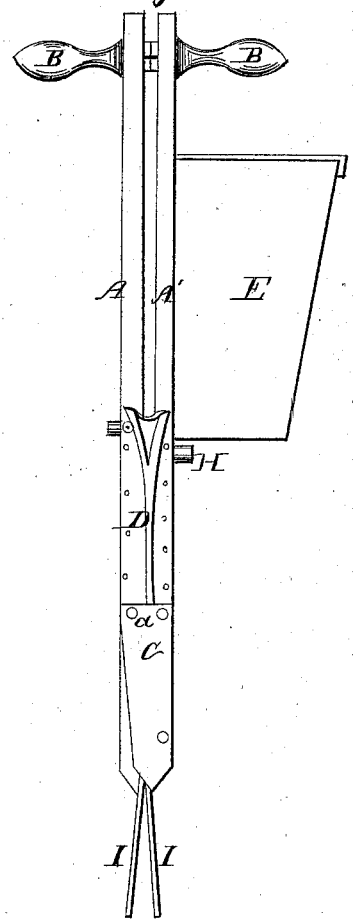

Figure 1 is a vertical central section of my invention; Fig. 2, a side view of the same.

Similar letters of reference indicate like parts.

This invention relates to a new and improved corn-planter of that class which are operated directly by the hand; and it has for its object the obtaining of an implement of the kind specified which will, during the planting operation, scatter the seed so that it will be dropped at suitable distances apart in the hills and admit of the stalks being sufficiently far apart that they will not interfere with each other in growing.

A A' represent two plates or side pieces, which may be of wood and each provided with a handle, B, at its upper end. The plate or side piece A' has a metal plate, C, secured to each side of it near its lower end, said plates projecting over the sides of the plate or side piece A, and connected thereto by screws or pivots $a$. The two side pieces above the plates A A' are connected by leather or cloth strips D.

E is a hopper or seed-box, which is attached to the side piece A', and into the lower part of which a slide, F, which is attached to the side piece A, works. (See Fig. 1.) This slide F is provided with an opening, $b$, the capacity of which may be graduated by an adjustable plate, $c$, and a cut-off or bush, G, is fitted in an opening in the plate A', through which opening the slide F passes into the hopper E.

To the plate A there is also attached a rod or bar, H, which passes through a hole, $e$, in the plate A', and to the lower end of each side piece, A A', there is attached a metal plate, I.

The operation of the device will be readily understood. The hopper E is supplied with a requisite quantity of seed, and the plates I are, when in contact, shoved down into the earth. The side pieces, A A', are then forced together or toward each other at their upper parts, and the seed or corn contained between the plates I dropped or deposited in the earth, and in the hole made by the separation of said plates, when the upper parts of the side pieces are pressed toward each other. The pressing of the side pieces, A A', toward each other causes the slide F to enter the hopper E and the hole or opening $b$ to fill with seed, and as the slide is drawn out from the hopper the seed falls from $b$ upon the rod or bar H, and is scattered thereby and falls down between the plates I I, where it is retained until said plates are again forced into the earth and spread apart by the forcing together of the side pieces, A A'. The side pieces, A A', are made wider below the hopper than above it in order to allow room for the scattering of the seed and admit of the full benefit of the rod or bar H being obtained. Thus by this simple arrangement I am enabled to drop the seed into the earth in a scattered condition, so as to favor subsequent growth and the proper development of the corn.

I do not claim novelty in the separate parts of my planter, excepting that for distributing or scattering the seed; but,

Having thus described my invention, I claim as new and desire to secure by Letters Patent—

The employment or use of the rod or bar H, when used in connection with the two side plates, A A', pivoted together, and provided with plates I I, and also provided respectively with the hopper E and the slide F, substantially as and for the purpose herein set forth.

The above specification of my invention signed by me this 16th day of March, 1865.

JACOB MORRIS.

Witnesses:
 JEFFERSON SULLENGER,
 S. T. EAST.